United States Patent
Shiu et al.

(10) Patent No.: US 9,035,557 B2
(45) Date of Patent: May 19, 2015

(54) CONVERTING CONTROLLER

(75) Inventors: Shian-Sung Shiu, New Taipei (TW);
Li-Min Lee, New Taipei (TW);
Chung-Che Yu, New Taipei (TW)

(73) Assignee: GREEN SOLUTION TECHNOLOGY CO., LTD., New Taipei (TW)

(*) Notice: Subject to any disclaimer, the term of this patent is extended or adjusted under 35 U.S.C. 154(b) by 744 days.

(21) Appl. No.: 13/364,333

(22) Filed: Feb. 2, 2012

(65) Prior Publication Data
US 2012/0229031 A1    Sep. 13, 2012

(30) Foreign Application Priority Data
Mar. 8, 2011    (TW) .............................. 100107635 A

(51) Int. Cl.
*H01J 7/42* (2006.01)
*H05B 33/08* (2006.01)

(52) U.S. Cl.
CPC ........... *H05B 33/0887* (2013.01); *Y02B 20/341* (2013.01)

(58) Field of Classification Search
USPC .................................. 315/51, 121, 122, 136
See application file for complete search history.

(56) References Cited

U.S. PATENT DOCUMENTS

| | | | |
|---|---|---|---|
| 5,747,955 A * | 5/1998 | Rotunda et al. | 318/434 |
| 6,040,668 A * | 3/2000 | Huynh et al. | 318/471 |
| 6,420,838 B1 | 7/2002 | Shackle | |
| 2003/0221674 A1 * | 12/2003 | Scanderbeg et al. | 123/479 |
| 2004/0085791 A1 | 5/2004 | Lin | |
| 2007/0291523 A1 * | 12/2007 | Fukumoto et al. | 363/134 |
| 2013/0271097 A1 * | 10/2013 | Lee et al. | 323/271 |
| 2014/0146429 A1 * | 5/2014 | Lee et al. | 361/86 |

FOREIGN PATENT DOCUMENTS

| | | |
|---|---|---|
| CN | 1725927 A | 1/2006 |
| CN | 101494412 A | 7/2009 |
| TW | 200419867 | 10/2004 |
| TW | I258065 | 7/2006 |
| TW | 200820561 A | 5/2008 |
| TW | 201106600 | 2/2011 |

* cited by examiner

*Primary Examiner* — William Hernandez
(74) *Attorney, Agent, or Firm* — CKC & Partners Co., Ltd.

(57) ABSTRACT

A converting controller comprises a power pin, a ground pin, at least one input pin, at least one output pin, at least one set pin and a failure generating circuit. The power pin is adapted to be coupled with a power source to receive electric power for operation, and the ground pin is adapted to be grounded. The input pin is adapted to receive a corresponding input signal and the output pin is used to output a corresponding output signal. The set pin is adapted to set a corresponding operating parameter of the converting controller. The failure generating circuit is coupled with and uses one of the input pin and the set pin as a protection output pin. The failure generating circuit modulates the level of the protection output pin to be a protection logic level when the converting controller is under a protection state.

9 Claims, 4 Drawing Sheets

US 9,035,557 B2

CONVERTING CONTROLLER

RELATED APPLICATIONS

This application claims priority to Taiwan Application Serial Number 100107635, filed Mar. 8, 2011, which is herein incorporated by reference.

BACKGROUND

1. Technical Field

The present invention relates to a converting controller, and more particularly to a converting controller with a protection output pin.

2. Description of Related Art

FIG. 1 is a schematic diagram of a QX9910 controller applied on an LED driving circuit, which the QX9910 controller is produced by QX Micro Devices Co., Ltd. The LED driving circuit, which comprises a converting circuit and a QX9910 controller 10, is used to drive an LED module 20. The converting circuit comprises an inductance L, a schottky diode Z, a switch SW and a current detecting resistance R. The QX9910 controller 10 controls the turn-on and turn-off states of the switch SW, and thereby input electric power of an input power source Vin is inputted into the converting circuit and is converted into an appropriate power source to drive the LED module 20 for emitting light. Besides, an input driving circuit can be added, which comprises an input resistance Rin, an input capacitance Cin and an input zener diode Zin. The input driving circuit is coupled with the input power source Vin to generate a power source VDD that supplies the power demanded by the QX9910 controller 10 via a power pin VD. An enabling pin EN of the QX9910 controller 10 is also coupled with the power pin VD, and the QX9910 controller 10 starts to perform operation when the power source VDD reaches an activation level.

The QX9910 controller 10 comprises a detecting resistance Rcs, a detecting capacitance Ccs, a comparator 2, a SR flip-flop 4, a driving circuit 6, a constant off-time circuit OFT and a reference voltage generator BG. The current detecting resistance R detects the current flowing though the LED module 20 to generate a current detecting signal Ifb when the switch SW is turned on. The detecting resistance Rcs and the detecting capacitance Ccs are coupled with the current detecting resistance R via the detecting pin CS to filter the current detecting signal Ifb which is inputted into a non-inverting terminal of the comparator 2. An inverting terminal of the comparator 2 receives a reference level 250 mV generated by the reference voltage generator BG, and generates a high-level output signal when the level of the current detecting signal Ifb is higher than 250 mV. A set terminal S of the SR flip-flop 4 is coupled with the constant off-time circuit OFT, and a reset terminal R thereof is coupled with an output terminal of the comparator 2, and an output terminal Q is coupled with the driving circuit 6. The driving circuit 6 is coupled with the constant off-time circuit OFT, and is also coupled with a controlled terminal of the switch SW via a driving pin DR. The SR flip-flop 4 turns off the switch SW via the driving circuit 6 when the reset terminal R receives the high-level output signal from the comparator 2. At this time, the constant off-time circuit OFT starts to count time. The constant off-time circuit OFT triggers the SR flip-flop 4 to turn on the switch SW again when an off period of the switch SW reaches a preset off period. The preset off period of the constant off-time circuit OFT is determined by a RC circuit which is composed of a set resistance Rf and a set capacitance Cf and is coupled with an off period set terminal TOF.

However, the QX9910 controller 10 has no mechanism to protect the circuit from abnormal operations. When at some situations of requiring other circuit(s) to perform protecting function(s), the QX9910 controller 10 also needs to increase additional pin(s) to communicate with the other circuit(s), thus increasing the package cost thereof.

SUMMARY

In view of the conventional converting controller failing to be protected from abnormal operations and needing additional pin(s) to perform protection function(s) with other circuit(s), the invention employs a multi-function pin to perform the protection function(s) and to communicate with the other circuit(s) without increasing packaging cost.

To accomplish the aforementioned and other objects, an exemplary embodiment of the invention provides a converting controller which comprises a power pin, a ground pin, at least one input pin, at least one output pin, at least one set pin and a failure generating circuit. The power pin is adapted to be coupled with a power source to receive electric power for operation, and the ground pin is adapted to be grounded. The at least one input pin is adapted to receive a corresponding input signal and the at least one output pin is used to output a corresponding output signal. The at least one set pin is adapted to set a corresponding operating parameter of the converting controller. The failure generating circuit is coupled with and uses one of the at least one input pin and the at least one set pin as a protection output pin. Wherein, the failure generating circuit modulates the level of the protection output pin to be a protection logic level when the converting controller is under a protection state.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
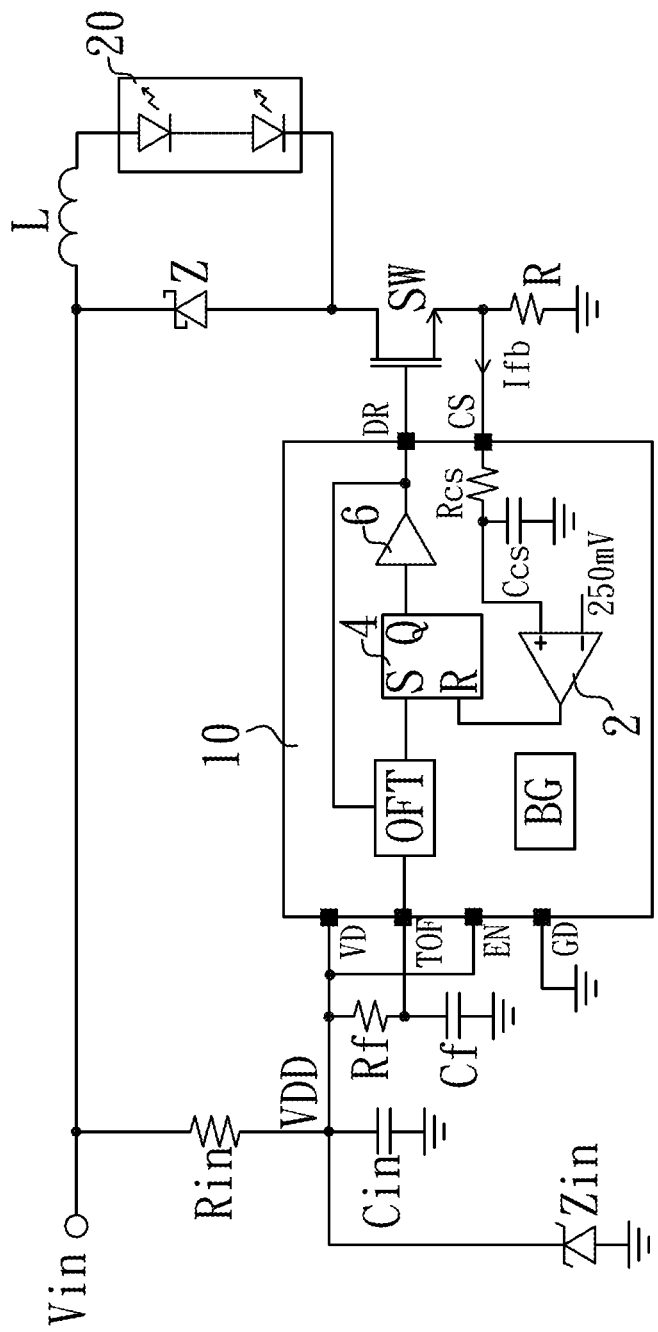
FIG. 1 is a schematic diagram of QX9910 controller made by QX Micro Devices Co., Ltd. being applied for an LED driving circuit.
Figure 2:
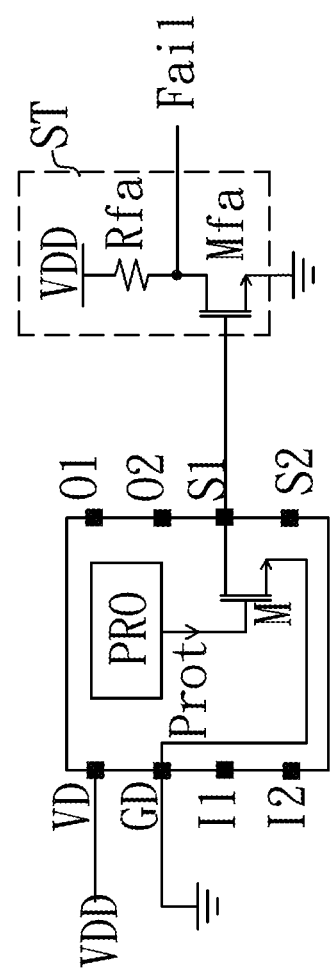
FIG. 2 is a schematic block diagram of a converting controller with a multi-function pin according to the present invention.

FIG. 2 is a schematic block diagram of a converting controller according to the present invention. The converting controller comprises a power pin VD, a ground pin GD, two input pins I1, I2, two output pins O1, O2, and two set pins S1, S2, wherein the number of the input pins, that of the output pins and that of the set pins can be adjusted by actual circuit demands. The power pin VD is adapted to be coupled with a power source VDD to receive electric power for operation, and the ground pin is adapted to be coupled with a ground. The input pins I1 and I2 are adapted to receive input signals, and the output pins O1 and O2 are used to output output signals. The set pins S1 and S2 are adapted to set operation parameters of the converting controller. The converting controller further comprises a failure generating circuit which includes a protection unit PRO and a transistor switch M. One terminal of the transistor M is coupled with a protection output pin (the set pin S1 in the present embodiment), and the other terminal thereof is coupled with one of the power pin VD and the ground pin GD (the ground pin GD in the present embodiment). The protection output pin is a multi-function pin. The protection output pin can be selected from the input pins and the set pins. The output pins of the converting controller are used to control the switches of the converting circuit, and thus are not suitable for use as the protection output pin at the same time. In the present embodiment, the multi-function pin is the set pin S1. Under a normal operation state, the set pin S1 is operated at the non-protection logic level. In the present embodiment, the potential of the protection logic level is zero. The protection unit PRO enables the converting controller to be under a protection state when an abnormal operation is determined and a protection signal Prot is generated to turn on the transistor switch M. Then, the level of the set pin S1 is pulled down to be zero, i.e. the protection logic level. Another circuit can be coupled to the set pin S1 and executes a protection procedure when the level of the set pin S1 is detected to at the protection logic level.

For preventing different preset logic levels between the converting controller and other circuits, the protection output pin can be externally connected to a logic level transforming circuit ST for adjusting the protection logic level. As shown in FIG. 2, the logic level transforming circuit ST comprises a transistor switch Mfa and a resistance Rfa. The transistor switch Mfa and the resistance Rfa are connected in series between the power source VDD and the ground. When the set pin S1 is at the protection logic level, the transistor switch Mfa is turned off, and thus a connecting node of the transistor switch Mfa and the resistance Rfa generate a high-level failure signal Fail to notify other circuits.

Figure 3:
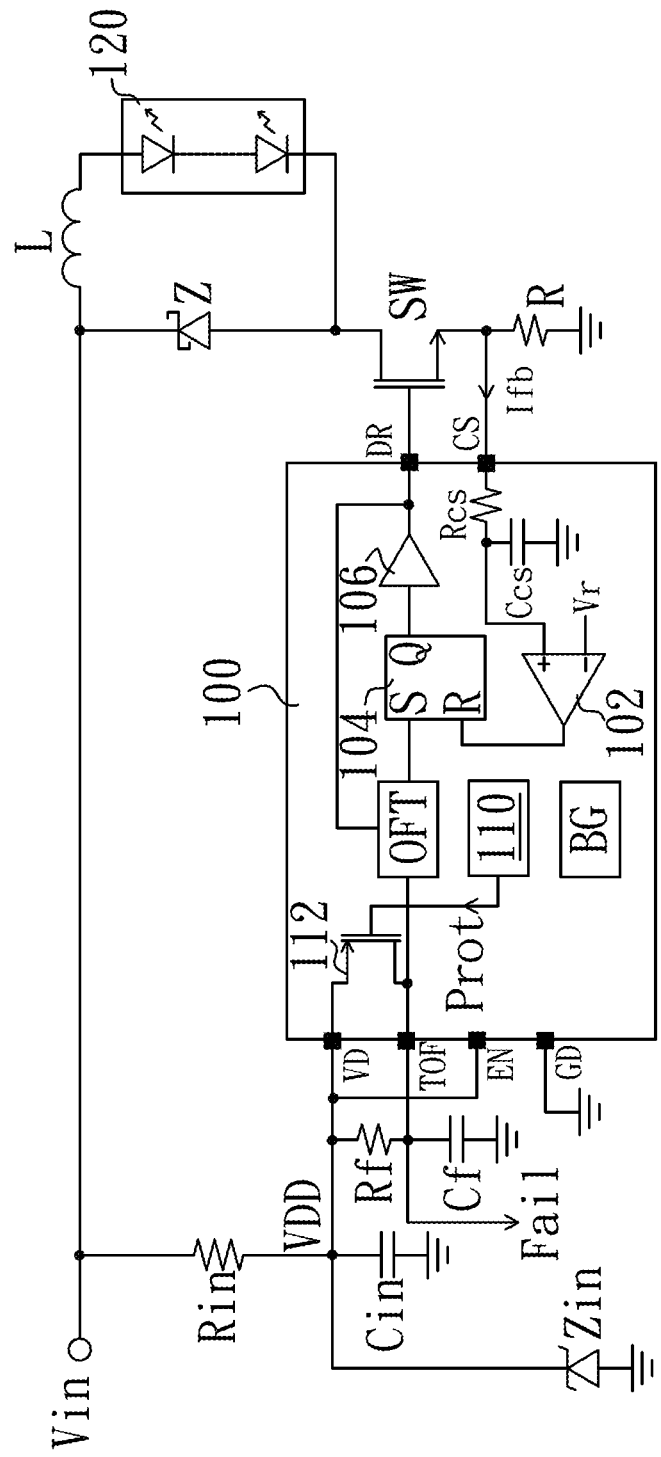
FIG. 3 is a schematic diagram of a converting controller with a multi-function pin according to a first embodiment of the present invention.

FIG. 3 is a schematic diagram of a converting controller with a multi-function pin according to a first embodiment of the present invention. The converting controller controls a power conversion of the converting circuit to drive an LED module 120. The converting circuit comprises an inductance L, a schottky diode Z, a switch SW and a current detecting resistance R. The converting controller 100 controls the switch to be at an on-state or an off-state to enable an input power source Vin to be converted into a suitable power source to drive the LED module 120 for emitting light. An input driving circuit comprises an input resistance Rin, an input capacitance Cin and an input zener diode Zin. The input driving circuit is coupled with the input power source Vin to generate a power source VDD for supplying power to the converting controller 100 via a power pin VD of the converting controller 100. The enabling pin EN of the converting controller 100 is coupled with the power pin VD, and the converting controller 100 starts to perform operation when the power source VDD reaches an activation level.

The converting controller 100 comprises a detecting resistance Rcs, a detecting capacitance Ccs, a comparator 102, a SR flip-flop 104, a driving circuit 106, a failure generating circuit, a constant off-time circuit OFT and a reference voltage generator BG, wherein the failure generating circuit comprises a protection unit 110 and a transistor switch 112. The detecting resistance Rcs and the detection capacitance Ccs are coupled with the current detecting resistance R via the detecting pin CS to filter out noises from the current detecting signal Ifb generated by the current detecting resistance R, and the filtered current detecting signal Ifb is inputted into the non-inverting terminal of the comparator 102. The inverting terminal of the comparator 102 receives the reference signal Vr generated by the reference voltage generator BG. The comparator 102 generates a high-level output signal when a level of the current detecting signal Ifb is higher than a level of the reference signal Vr. A set terminal S of the SR flip-flop 104 is coupled with the constant off-time circuit OFT, and a reset terminal R thereof is coupled with an output terminal of the comparator 102, and an output terminal Q thereof is coupled with the driving circuit 106. The driving circuit 106 is coupled with a constant off-time circuit OFT, and is also coupled with a controlled terminal of the switch SW via a driving pin DR. The reset terminal R of the SR flip-flop receives the high-level output signal generated by the comparator 102, and turns off the switch SW through the driving circuit 106. At this time, the constant off-time circuit OFT starts to count time. The SR flip-flop 104 is triggered to turn on the switch SW again when an off period of the switch SW reaches a preset off period. The preset off period of the constant off-time circuit OFT is determined by a RC circuit which is composed of a set resistance Rf and a set capacitance Cf and is coupled with the off period set terminal TOF.

A terminal of the transistor switch 112 of the failure generating circuit is coupled with the power pin VD, and another terminal thereof is coupled with the off period set terminal TOF. In the present embodiment, the off period set terminal TOF is a multi-function pin. The protection unit 110 generates a protection signal Prot with a high level when the converting controller is operated normally. The transistor switch 112 is a P-type MOSFET and is turned off at this time. When the off period set terminal TOF turns on the switch SW, the set capacitance Cf is under a discharging state to make a voltage level therecross be zero. When the switch SW is turned off, the off period set terminal TOF stops discharging the set capacitance Cf discharged. At this time, a current flowing through the set resistance Rf charges the set capacitance Cf. When a voltage level of the set capacitance Cf is increased to a preset off level, the off set terminal TOF generates a high-level signal to trigger the SR flip-flop 104 to turn on the switch SW again and enable the set capacitance Cf to be under the discharging state. The preset off level is lower than the level of the power source VDD. When the converting controller 100 incurs any abnormal operation, for example, the LED module 120 is short-circuited or open-circuited; the switch SW is short-circuited or open-circuited; the current flowing through the switch SW is excessively high or the voltage therecross is excessively high; the level of the protection signal Prot is changed to a low level to turn on the transistor switch 112. At this time, the potential of the off period set terminal TOF is pulled up to the same level as the power source VDD, i.e. the protection logic level used a failure signal Fail output. The failure signal Fail can be outputted to another circuit such as a power source circuit (not shown) for supplying the power source Vin, thereby lowering a voltage of the power source Vin or stopping supplying the power source Vin.

Certainly, the multi-function pin may use another pin to substitute the off set terminal TOF. For example, the enabling pin EN of the converting controller 100 shown in FIG. 3 may serve as the protection output pin at the same time. If the enabling pin EN is not directly connected to the power pin VD but receives an external enabling signal, one terminal of the transistor switch 112 of the failure generating circuit can be coupled with the ground pin GD, and the other terminal thereof can be coupled with the enabling pin EN. When the converting controller 100 incurs any abnormal operation, the protection signal Prot is transferred to a low-level from a high-level so as to turn on the transistor switch 112, and meanwhile, a level of the enabling pin EN is a protection logic level of zero level and the converting controller 100 stops operating. If a protection logical level of another circuit coupled to the protection output pin is set to the high level, a logic level transforming circuit ST shown in FIG. 2 can be externally connected to transform the level of a failure signal Fail to a high level.

Figure 4:
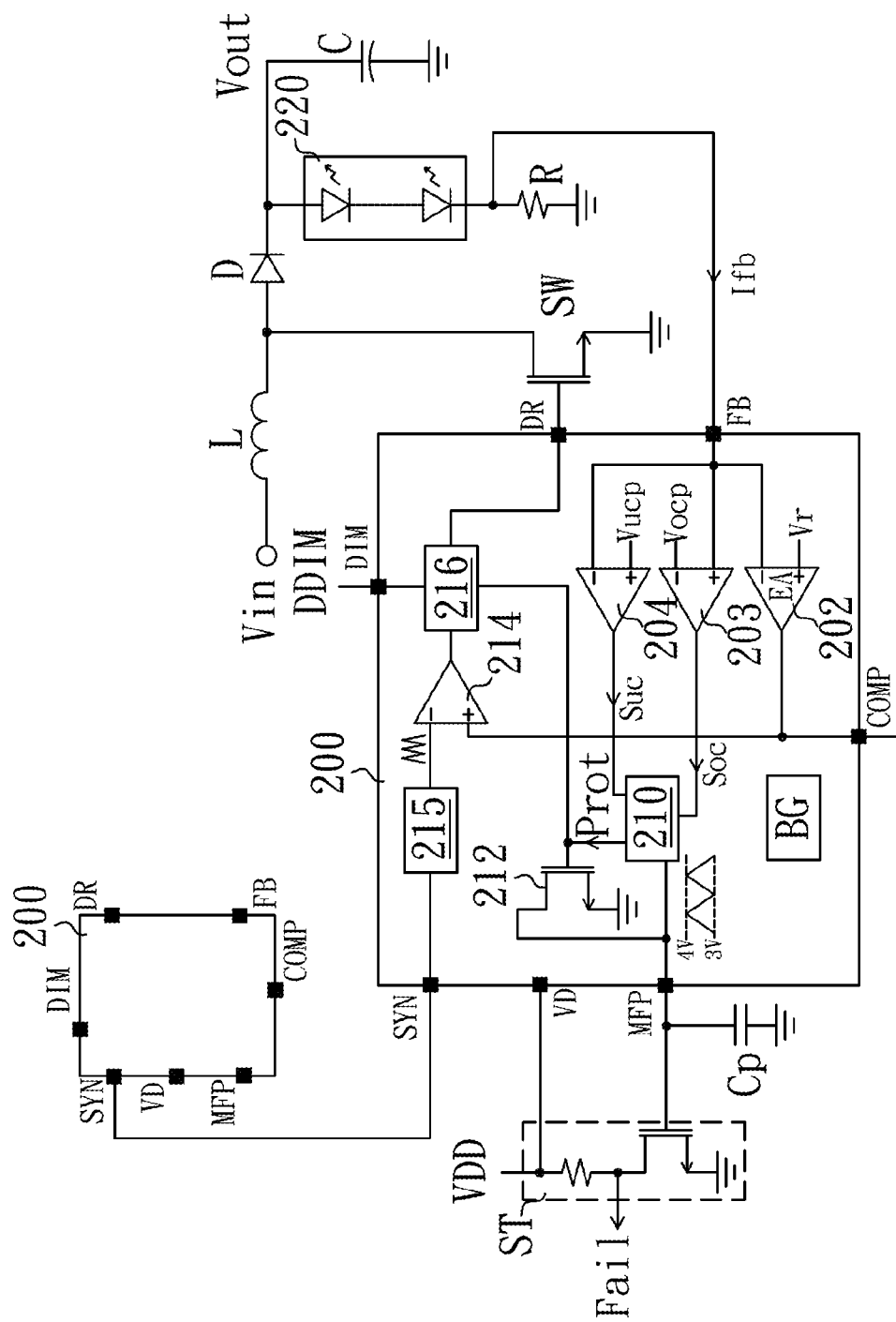
FIG. 4 is a schematic diagram of a circuit of converting controller with a multi-function pin according to a second embodiment of the present invention.

FIG. 4 is a schematic diagram of a converting controller with a multi-function pin according to a second embodiment of the present invention. The converting circuit controls a power conversion of a DC to DC converting circuit to drive the LED module 220. In the present embodiment, the DC to DC converting circuit, which comprises an inductance L, a switch SW, a diode D, an capacitance C and a current detecting resistance R, is a boost converting circuit to boost the input power Vin to an output voltage Vout so as to drive the LED module 220. The current detecting resistance R detects a current flowing through the LED module 220 to generate a current detecting signal Ifb. The converting controller 200 receives the current detecting signal Ifb via a feedback pin FB, and outputs a control signal by a drive pin DR to control the switch SW being an on or off state. The duty cycle of the control signal is determined by the current detecting signal Ifb.

The converting controller 200 comprises an error amplifier 202, an over-current comparator 203, an under-current comparator 204, a failure generating circuit, a pulse width modulated comparator 214, a triangular wave generating circuit 215, a logic driving circuit 216 and a reference voltage generator BG, wherein the failure generating circuit comprises a protection unit 210 and a transistor switch 212. An inverting terminal of the error amplifier 202 receives the current detecting signal Ifb via the feedback pin FB, and a non-inverting terminal thereof receives a reference signal Vr generated by the reference voltage generator BG, and an output terminal thereof outputs an error amplified signal. The output terminal of the error amplifier 202 is externally connected to a compensation capacitance Cc via a compensation pin COMP to compensate for the error amplified signal. The triangular wave generating circuit 215 generates a triangular wave signal to an inverting terminal of the pulse width modulated comparator 214, and a non-inverting terminal of the pulse width modulated comparator 214 receives the compensated error amplified signal to generate a pulse width modulated signal to the logic driving circuit 216. The logic driving circuit 216 generates and outputs a control signal to control the switch SW by the drive pin DR according to the pulse width modulated signal and a dimming signal DDIM received by a dim pin DIM.

A non-inverting terminal of the over-current comparator 203 receives the current detecting signal Ifb via the feedback pin FB, and an inverting terminal receives an over-current reference signal Vocp generated by the reference voltage generator BG. The over-current comparator 203 generates an over-current protection signal Soc at an output terminal when the level of the current detecting signal Ifb is higher than that of the over-current reference signal Vocp, wherein the level of the over-current reference signal Vocp is higher than that of the reference signal Vr. The over-current protection signal Soc represents that the current flowing through the LED module 220 is increased improperly and exceeds a preset current judgment value due to short circuit or other circuit abnormalities. An inverting terminal of the under-current comparator 204 receives the current detecting signal Ifb via the feedback pin FB, and a non-inverting terminal thereof receives an under-current reference signal Vucp generated by the reference voltage generator BG. An output terminal of the under-current comparator 204 generates an under-current protection signal Suc when the level of the current detecting signal Ifb is lower than that of the under-current reference signal Vucp, wherein the level of the under-current reference signal Vucp is lower than that of the reference signal Vr. The under-current protection signal Suc represents that the current flowing through the LED module 220 is decreases improperly and is lower than a preset under-current judgment value due to open-circuit or other circuit abnormalities. The protection unit 210 may comprise an oscillator, such as a voltage controlled oscillator (VCO). The oscillator is coupled with a protection frequency capacitance Cp via a multi-function pin to generate a protection frequency, and thus the protection unit 210 can count time in accordance with the protection frequency to avoid resulting in erroneous protection judgment due to noises. The protection unit 210 starts to count time according to the protection frequency when receiving any one of the under-current protection signal Suc and the over-current protection signal Soc. The protection unit 210 turns on the transistor switch 212 while one of the under-current protection signal Suc or the over-current protection signal Soc has been generating for a preset period. A terminal of the transistor switch 212 is coupled with the multi-function pin MFP, and another terminal is thereof grounded. The transistor switch 212 pulls down a voltage of the frequency capacitance Cp to a protection logic level of zero level when being turned on.

The multi-function pin MFP of the converting controller 200 can be externally connected to a logic level transforming circuit ST to transform the protection logic level. The logic level transforming circuit ST comprises a transistor switch Mfa and a resistance Rfa which are connected in series between the power source VDD and the ground. In the present embodiment, the voltage of the protection frequency capacitance Cp is oscillated between 3V and 4V, and is higher than a threshold voltage of the transistor switch Mfa, when the converting controller 200 is operated normally. Therefore, the transistor switch Mfa is turned on to enable the level of the connecting node of the transistor switch Mfa and the resistance Rfa to be zero potential. When the level of the multi-function pin MFP is pulled down to zero potential, the transistor switch Mfa is turned off to increase the level of the connecting node of the transistor Mfa and the transistor Rfa to the level of the power source VDD, so as to generate and output a failure signal Fail to other circuit(s).

It should be noted that, the triangular wave generating circuit 215 may receive a synchronizing signal via a synchronous pin SYN so as to synchronize an operation of the converting controller 200 with the synchronizing signal. The triangular wave signal generated by the triangular wave generating circuit 215 may be outputted via the synchronous pin SYN to a plurality of converting controllers for synchronization. The triangular wave generating circuit 215 simultaneously accepts synchronizing signals generated by other converting controllers, and performs synchronization based on the converting controller with the highest frequency received via the synchronous pin SYN to enable the converting controllers 200 to be operated synchronously.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A converting controller, comprising:
   a power pin adapted to be coupled with a power source to receive electric power for operation;
   a ground pin adapted to be coupled with a ground;
   at least one input pin for receiving a corresponding input signal;
   at least one output pin for outputting a corresponding output signal;
   at least one set pin adapted to set a corresponding operating parameter of the converting controller;
   a failure generating circuit which is coupled with and uses one of the at least one input pin and the at least one set pin as a protection output pin; and
   an oscillator which is coupled with the protection output pin, wherein the oscillator determines a frequency according to one element which is externally connected to the protection output pin;
   wherein the failure generating circuit modulates a level of the protection output pin to be a protection logic level when the converting controller is under a protection state.

2. The converting controller according to claim 1, wherein the failure generating circuit is coupled with the oscillator and modulates the level of the protection output pin to be the protection logic level when the converting controller is timed based on the frequency and has been situating under the protection state for a predetermined time period.

3. The converting controller according to claim 2, wherein the protection output pin is externally connected to a logic level transforming circuit to adjust the protection logic level.

4. The converting controller according to claim 3, wherein the logic level transforming circuit comprises a transistor switch and a resistance which are connected in series between the power source and the ground.

5. The converting controller according to one of claim 3, further comprising a synchronous pin adapted to be operated at a synchronous frequency according to a synchronizing signal.

6. The converting controller according to one of claim 1, further comprising a synchronous pin for allowing the converting controller to be operated at a synchronous frequency according to a synchronizing signal.

7. The converting controller according to claim 1, wherein the converting controller is used to control a DC (direct current) to DC converting circuit to drive an LED (Light-Emitting Diode) module.

8. The converting controller according to claim 7, wherein the converting controller detects that a state of the LED module is under the protection state while the LED module is at an open-circuit state or a close-circuit state.

9. The converting controller according to claim 1, wherein the failure generating circuit comprises a transistor switch coupling the protection output pin to one of the power pin and the ground pin, and the failure generating circuit turns on the transistor switch to modulate the level of the protection output pin to be a protection logic level.

* * * * *